United States Patent [19]

Ott

[11] 4,021,734

[45] May 3, 1977

[54] COULOMETRIC MEASURING INSTRUMENT WITH PLUG ADAPTERS FOR MAKING DIFFERENT MEASUREMENTS

[76] Inventor: Albert Ott, Sindelfingerstrasse 118, 7032 Sindelfingen 6, Germany

[22] Filed: Jan. 8, 1976

[21] Appl. No.: 647,652

[30] Foreign Application Priority Data

Jan. 30, 1975 Germany ................... 7502684[U]

[52] U.S. Cl. ................... 324/94; 324/156; 324/158 F; 339/176 MP
[51] Int. Cl.² ................... G01R 27/22; G01R 1/04
[58] Field of Search ............. 324/94, 29, 156, 30, 324/157, 158 F; 339/176 MP, 17 CF; 317/101 CC, 101 CP

[56] References Cited

UNITED STATES PATENTS 3,912,983  10/1974  Lowry ........................... 324/158 F Primary Examiner—Gerard R. Strecker

[57] ABSTRACT

A device for the coulometric measurement of the thickness of thin metal layers of different material on a base has switch-over devices permitting switching to the measurement problem at hand and an electrolytic switch-over device. Accessible from the outside of the device, a first plug section, coupling electrical lines, is provided. Second plug sections having a shape necessarily resulting in correct plugging can be selectively plugged into the first plug section. The second plug section mounts electrical circuit elements of values pertaining to a separate measurement problem, which elements are connected to the plug contacts.

19 Claims, 9 Drawing Figures

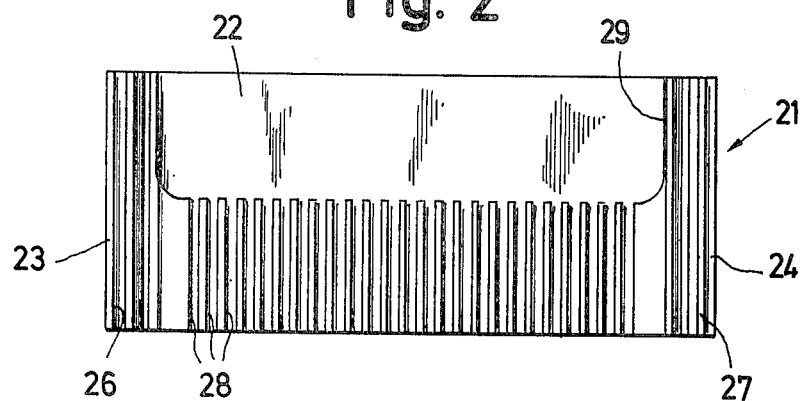
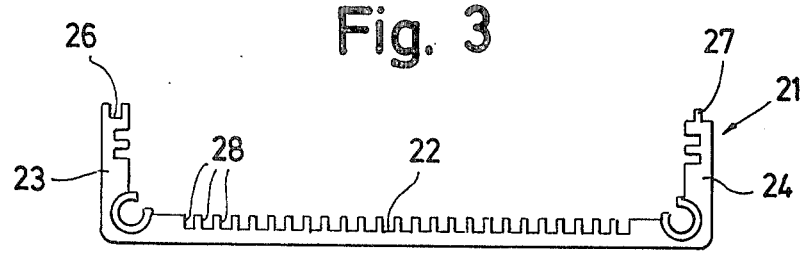
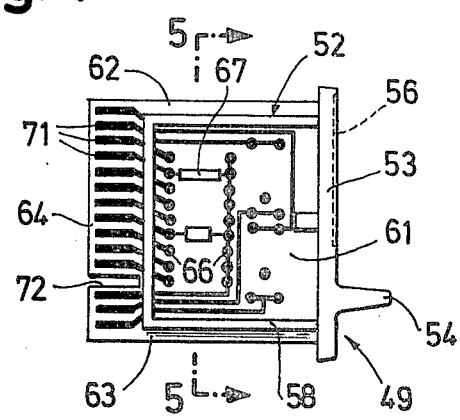
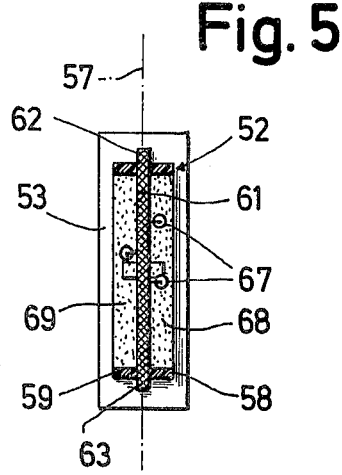

| Fig. 6 | Fig. 7 |
|---|---|
| LAYER Sn<br>BASE Fe, Ni, Cu Ms<br>150<br>2 μm/min<br>ELECTROLYTE F9 | LAYER Cr<br>BASE Fe, Ni, Al<br>150<br>10 μm/min<br>ELECTROLYTE F1 |

| Fig. 8 | Fig. 9 |
|---|---|
| LAYER Ag<br>BASE Cu, Ms<br>150<br>2 μm/min<br>ELECTROLYTE F3 | LAYER Cu<br>BASE Fe, Ni, Al<br>150<br>10 μm/min<br>ELECTROLYTE F4 |

COULOMETRIC MEASURING INSTRUMENT WITH PLUG ADAPTERS FOR MAKING DIFFERENT MEASUREMENTS

BACKGROUND OF THE INVENTION

The present invention relates to a device for the coulometric measurement of the thickness of thin metal layers of different material on a base, with switch-over devices permitting switching to the measurement problem at hand, with a cell switch-over device and with networks assigned to the various measurement problems.

With such measuring instruments, the thickness of thin metal layers can be measured as follows: A cell filled with suitable electrolyte is placed on the layer, the layer to be measured is connected as anode, a cathode is provided, producing an element which has a certain element potential. This element potential has various levels which can be easily distinguished when the right electrolyte is being used. Without current flow, a low potential results. If current flows, a higher potential develops while the layer to be measured is removed and an even higher potential suddenly appears when the layer is finally removed entirely.

This sudden potential increase is commonly used to stop a clock counter for measuring the time which was necessary to remove the metal layer under the action of the constant DC current through the cell. The final indication of this counter may be calibrated in units of the thickness of the layer.

In practice, a large number of measurement problems are of interest. For example, zinc layers, copper layers, silver layers, gold layers, chromium layers, etc. are to be measured. Care must be taken that, before the actual measuring process, a stirring apparatus is set into motion which makes the electrolyte circulate. This is necessary in order to remove air bubbles from the walls of the anode or the cathode. In addition, the stirring apparatus must be turned off at the right moment. One must also determine from what potential threshold the counting process must start and at what potential threshold the counting process must stop. Depending on the situation, different removal currents are necessary. In the digital display of the measured value, the decimal point must appear at the correct location, which requires different networks from case to case. Any case requires a definite pulse sequence as a measure of the removal speed etc. In addition to the variable parameters mentioned so far, there are also constant parameters which are realized by constant electrical networks.

Suitable electro chemical cells with thickness measurement capabilities as well as the electrical circuitry for the voltage supply, regulation circuits to keep the cell current constant, timing circuits, converter circuits for a digital display of the thickness of the metal layer, and so on are wellknown in the art of coulometric thickness measurement devices and therefore not the basic object of the present invention.

Even if it is always the same procedure, which is carried out by the device, when the thicknesses of layers of different metals are to be measured, there is with respect to the different metal layers to be measured a great variety of parameters which require the device to be adaptable to a lot of different sets of such parameters. Some of these parameters are the following:

1. Interface potential at the metal/electrolyte boundry which potential must be overcome by the applied voltage.
2. Different ion mobilities of different sorts of metals.
3. Different valencies of the metal ions.
4. Geometric dimensions of the metal layer and/or of the electro chemical cell.
5. Composition of the electrolyte.
6. Temperature.

In operation, the electrodes of the cell which is selected and used for measurement must be electrically connected to the power supply and the current regulating and signal detecting circuits which are conditioned for proper measurement by adjusting their electrical characteristics in accordance with the above mentioned parameters. To this object, adjustable elements for these cells and circuits are probided in a very usual manner with push-buttoms, rotatable knobs or the like for manual adjustment. push-buttons, With devices of this type hitherto known in the art, the circuits were permanently wired inside the device and on the outside of the device there were provided pushbuttons or rotary switches which had to be set for a certain measurement problem. If, e.g., the thickness of copper layers was to be measured, the Cu pushbutton was pushed or a rotary switch was set into the associate position.

It is obvious that these devices are relatively inflexible, because in no case can the circuits be changed quickly and inexpensively or can be adapted to unusual measurement problems.

On the other hand, there also may be users who do not wish to make use of all the capacity wired into these instruments, such as, e.g., chromium, nickel, copper, brass, zinc, cadmium, tin, silver, gold.

Finally, repair is expensive and cumbersome if a design element in the networks should fail.

It is, therefore, an object of the present invention to create a device which can be flexibly and inexpensively adapted to any measurement problem, whether it be a standard measurement problem or a more unusual measurement problem.

SUMMARY OF THE INVENTION

The objects of the present invention are acheived as follows:
a. Accessible from the outside of the device, a first plug section, coupling electrical lines, is provided.
b. Second plug sections having a shape necessarily resulting in correct plugging can be selectively plugged into the first plug section.
c. The second plug section mounts electrical circuit elements of values pertaining to a separate measurement problem, which elements are connected to the plug contacts. Hence, the user must only have as many second plug sections in storage as he has measurement problems. If his number of measuring problems increases, or he changes his scope of business, the manufacturer can quickly supply him with the required second plug section, without having to modify the device at all.

The device has a recess therein and the first plug means is solidly mounted in the recess. The first plug section might also be connected to the device by means of a cable. However, when proceeding in accordance with these improvements one obtains a more compact device whose first plug section is safely stored away.

The recess is accessible from the front. As a result of these improvements, the recess is located at a spot which is not covered by other devices stacked on top of each other. In addition, the plug section can be conveniently plugged in and it is apparent which plug section is being used at any time.

The first plug means is a multiprong connector arranged and adapted for direct plug-in. As a result of this improvement one avoids the problems which arise with round plugs and where one must repeatedly try in which position the first plug section will fit the second plug section. In addition, direct plugging obviates the necessity of having to provide a separate coupling part on the second plug section.

A plurality of first plug means are provided, for example four or five, and a plurality of switch means are assigned to them and located above or below the plug means. As a result of these improvements, it is possible to provide that number of second plug sections which correspond to the measurement problems and to quickly and correctly activate the correct plug section. Hence, the correlation of the right switch and the right plug section becomes easy, even with untrained personnel.

A plurality of multiprong connectors are located parallel to each other in a common recess and are located deep inside the device. As a result of these improvements it is possible to combine the second plug sections and the multipoint connector into a block. Since a major part of the multipoint connectors are placed inside the device, the second plug sections can use the resulting space and need project beyond the frontside of the device no more than absolutely necessary.

A plurality of multiprong connectors are double-pronged. As a result of this improvement the second plug sections can be held more mechanically secure in the multipoint connectors and twice the electrical security is available.

The recess contains a rectangular frame which has guide grooves for the second plug means which are in line with the plug-in plane of the first plug means. As a result of these improvements the mounting frame can be used for guidance purposes and a compact mounting module results.

The rectangular frame is a mass-produced item which has more guide grooves than there are first plug means and wherein a recess in line with these grooves is provided in the front of the device only in front of the grooves required for the plug means. As a result of these improvements one may use a less expensive rectangular frame and the operator, nevertheless, cannot make a mistake when inserting the second plug section.

The first plug means are mounted on the rectangular frame and the rectangular frame has a suitable cutout therefor. As a result of these improvements it is possible to install the multipoint connectors into the rectangular frame, and not merely to attach them, thus providing a more formlocked unit which is able to cope with the forces arising during the plugging processes.

The second plug means has a conductor plate which carries the circuit elements, a frame solidly connected to the conductor plate, one wall of which, when the second plug means is plugged-in, closes the recess at least partially, a grip handle for withdrawing and plugging-in the second plug means and an inscription field. As a result of these improvements it is possible to better manipulate the conductor plate with the frame, the recess is covered more and the labeling, e.g., by pasting on a label, easily identifies the type of second plug section being inserted.

The frame has at least part of the conductor plate as bottom, wherein the upper edge of the frame is located at a higher level than the circuit elements and wherein the space between the frame is filled up to the frame's upper edge with a sealing compound. As a result of these improvements the frame protects the area occupied by electrical circuit elements during manufacture, and later provides the molding shape for the mold compound, so that an esthetically appealing second plug section is developed.

The frame comprises two frame parts in whose center plane the conductor plate is located. As a result of this improvement the conductor plate can be printed on both its sides, so that the second plug section can be kept small. The resulting symmetry also accommodates the symmetry of the keyways and of the multipoint connectors.

The device has guide grooves for the second plug means and the second plug means has two guide ribs which run parallel and apart from each other, with their distance corresponding to the clearance between the guide grooves and their thickness corresponding to the clearnace width of the guide grooves. As a result of these improvements one obtains a simple guidance of the second plug section in the keyways, which is inexpensive and can take high loads.

The second plug means comprises a rectangular conductor plate within a frame, at least partially, and the guide ribs constitute first and second rim areas projecting beyond the frame of the rectangular conductor plate. As a result of these improvements special guidance ribs are not necessary and the favorable mechanical properties of the conductor plates are used for their guidance.

The conductor plate has a third rim area with which it can be plugged into the associated first plug means and has the contact means thereon. As a result of these improvements one obtains a particularly simple form of direct plug-in and a good fit of the second plug section in the multipoint connectors.

The contact means are located in pairs on both sides of the conductor plate and are metallically connected to each other when plugged in. As a result of this improvement assurance of the plug-in is doubled. boundary The conductor plate has a third rim area which has the contact means thereon and projects beyond the frame. As a result of this improvement the third edge remains free of sealing compound and hence the conductor plate is held between the frame even in the third bounday region. Therefore, the conductor plate may be completely level.

The inscription field is recessed and has a surface suitable for pasting on labels. As a result of this improvement the labeling can be attached permanently, easily and securely.

The novel features which are considered as characteristic for the invention are set forth in particular in the appended claims. The invention itself, however, both as to its construction and its method of operation, together with additional objects and advantages thereof, will be best understood from the following description of a specific embodiment when read in connection with the accompanying drawings.

FIG. 2 is a top view of the lower half of a guidance and mounting frame;

FIG. 3 shows the view in accordance with arrow A in FIG. 2;

FIG. 4 is the side view of an unsealed plug section;

FIG. 5 shows a section taken along line 5—5 of FIG. 4; and

FIGS. 6 through 9 show diverse labels which can be pasted on the second plug sections.

DESCRIPTION OF THE PREFERRED EMBODIMENT

Figure 1:
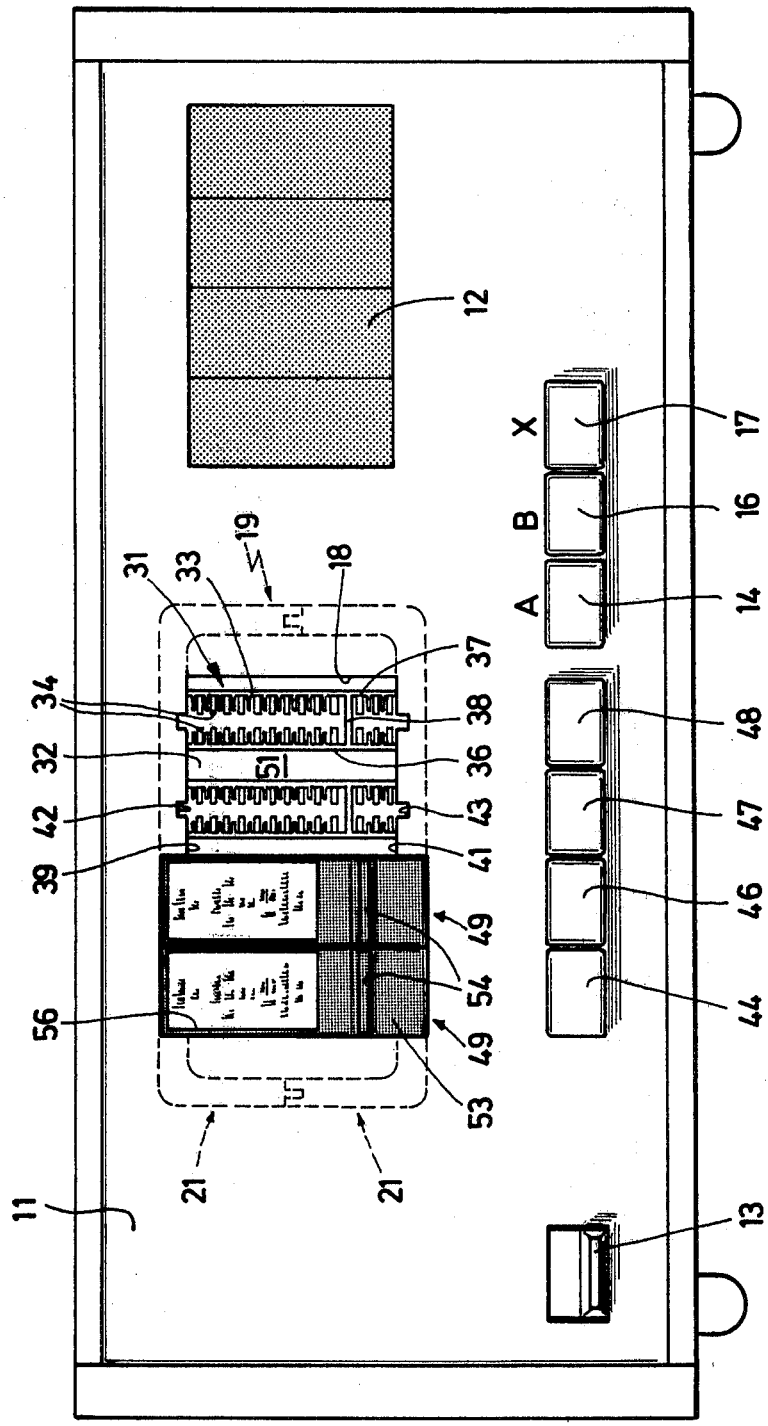
FIG. 1 is a front view of a device in accordance with the present invention.

Referring to FIG. 1, the device in accordance with the present invention has a front plate 11. The upper right-hand portion contains a digital display 12 for the direct display with the correct decimal point of the thickness of the layer removed. A line switch is located on the lower left-hand side. In addition, the device has connection facilities, switches, luminous displays, etc. (not further mentioned and shown).

Pushbuttons 14, 16, 17 on the lower righthand portion facilitate connection of a cell A, a cell B and any cell X.

In the center of the front plate 11, there is a rectangular cutout 18 which is about 6 cm wide and 4.5 cm high. Behind cutout 18, there is a solidly mounted rectangular frame 19 comprising two half-frames 21. The half-frame 21 has a bottom 22 and two side walls 23, 24. The front surface of side wall 23 contains a longitudinal groove 26 (FIG. 2) in its upper portion and sidewall 24 contains a longitudinal tongue 27 in its upper portion. With the other half-frame, the groove- and tongue conditions are complementary and one may, therefore, assemble two half-frames 21 into a whole frame 19. On the inside of its bottom, or, with the upper half-frame on the inside of its ceiling, the half-frames have a series of longitudinal grooves 28. In the embodiment shown, there are 25 longitudinal grooves of about 1.8 mm width. At half-width, the bottom 22 — and accordingly the ceiling of the other half-frame 21 — has a rectangular cutout 29 milled into it. It extends a little deeper than the bottom of the longitudinal grooves 28. Frame 19 is mounted to the device in a manner not shown. Between the two milled cutouts 29, there are mounted at right angles four multipoint connectors 31 which have spacers 32 between them. Multipoint connector 31 has a synthetic frame 33 in which contact tongues 34 are embedded in two rows, and are located vertically on top of one another. With each multipoint connector 31, two contact tongues 34 on the same level belong electrically to one another. The two side walls 36, 37 of the multipoint connector are connected to one another by a horizontal wall 38. This wall 38 is purposely made asymmetrical in its height dimension.

The upper and lower rim 39, 41 of cutout 18 lines up with the front surface of the ribs remaining between the longitudinal grooves. Only where there are pairwise slots 42, 43 in the open rims are the longitudinal grooves 28 located behind accessible from the outside. The cross section of slots 42, 43 is the same as that of the longitudinal grooves 28.

Underneath each multipoint connector 31 there is a pushbutton switch 44, 47, 46, 48 which, when actuated, connects the multipoint connector 31 and an element (to be discussed later) to other networks located inside the device. But only one of pushbutton switches 44, 46, 47, 48 can be pressed at any one time.

Each multipoint connector 31 mates with plug sections 49 which have similar dimensions. For the sake of simplicity, it was assumed for the embodiment that only four plug sections 49 can be accommodated in the recess 51 formed by the multipoint connectors 31 and the frame 19. However, with actual embodiments, it may be five, six, seven and more plug sections.

The plug section 49 comprises an injection molded unit which hereinafter will be designated as frame 52. Its front wall 53 is higher than cutout 18 and its width is such that with a fully occupied recess (niche) 51, the front walls 53 of all plug sections 49 cover the width of the niche 51. To the front of the front wall 53, there is formed a flat griphandle 54 by means of which frame 52 can be grasped. The grip handle 54 is placed away from the center downward, so that a relatively large undivided labeling field results which is recessed as shown in FIG. 4.

Parallel to center plane 57, there are molded on the front wall 53 two frame parts 58, 59 which accommodate a conductor plate 61 (circuit board) between themselves. As shown in FIG. 4, the conductor plate 61 abuts against the front wall 53 or even passes into it. From the upper pairs of legs of frames 58, 59, there protrudes the conductor plate 61 with a guide rib 62; from the lower horizontal pairs of legs of frames 58, 59, there protrudes conductor plate 61 with a guide rib 63, and on the left-hand side, conductor plate 61 with a plug rim 64 beyond the vertical pairs of legs of frames 58, 59. The conductor plate 61 is rectangular, made of material conventional for such plates, while frame 52 is an injection molded unit. The conductor plate 61 carries current paths 66 which are printed on the circuit board (conductor plate) 61. Electrical circuit elements 67 are soldered to the current paths 66. Afterwards, the plug section 49 is laid flat so that the frame 58 faces upward. Sealing compound 68 is poured into the resulting form. In an analogous manner, sealing compound 69 is poured in from the other side, so that one gets a compact unit whose sensitive parts are protected and which, nevertheless, is small and can be handled easily.

The plug rim 64 carries horizontal printed current paths 71 on both its sides. These current paths correspond to the geometry and to the number of contact prongs 34. Hence, one can insert a plug section 49 with its guide ribs 62, 63 into sots 42, 43. Then the longitudinal grooves 28 behind assume the guidance function. During further insertion, the plug rim 64 gets between the prongs 34 of the associated multipoint connector 31 which electrically connect the plug section 49 and hold it mechanically.

Labels as shown in FIGS. 6 through 9 can be pasted in the inscription field 56. For example, FIG. 6 shows a label which indicates that the layer to be removed must be made of tin, that the base material may be iron, nickel, copper, brass or insulating material, that the removal speed is 2 micrometers/minute and that F9 is to be used as electrolyte; F9 is obtainable from Helmut Fischer, 7032 Sindelfingen 6, Industriestrasse 21, West Germany.

FIG. 7 shows a label for a plug section 49 which must be used when the thickness of chromium layers is to be measured. The base layers may be iron, nickel, aluminum and insulating material, the removal speed is 10 micrometers/minute, etc. The contents of the labels shown in FIGS. 8 and 9 need not be explained.

In operation, a certain cell is connected. If it is cell B, one presses pushbutton switch 16. If the plug section 49 assigned to this measurement problem is already inserted in niche 51, one presses one of pushbutton switches 44 – 48 underneath. Otherwise, one obtains a plug section suitable for the measurement problem from the storage room, inserts it at any location in niche 51 and presses the pushbutton 44, 46, 47, 48 underneath.

The label already indicates how the plug section 49 is to be inserted. However, in order to make sure, the plug rim has a horizontal cutout 72 in accordance with FIG. 4; this cutout is at the same level as wall 38 and is wider than it. Only in this position can the plug sections 49 be inserted.

What is claimed is:

1. A device for the coulometric measurement of the thickness of thin metal layers of various materials on a base, including the following known parts: electro chemical cells in which the metal layer is used as one electrode for passing a d.c.-current through the cell under the action of which the layer is removed from the base, electrical circuit means for controlling the d.c.-current through the cell, electrical circuit means for detecting potential changes occuring at the electrodes of the cell at least when the current begins to remove the layer and when the layer is completely removed, and a time counter for measuring the time in which a certain current flows, which is stopped by the latter detected potential changes, comprising electrical circuit means for the adaptation of the device to various measurement problems,
manually actuable switch means connecting said adaptation means to the electrical control and detecting means,
manually actuable switch means for electric connection of the cell used in the measurement problem to the electrical power supply and detecting means of the device,
a plurality of first plug means accessible to the outside of the device and electrically connected to said electric control and detecting circuit means, which are permanently wired portions of the electric circuitry of the device, and
a plurality of second plug means having said adaptation means arranged thereon in the form of electrical circuit elements having values pertaining to separate measurement problems and carrying contact means electrically connected to said circuit elements and adapted to be selectively plugged into the first plug means and having shapes which facilitate the correct plugging into the first plug means.

2. The device according to claim 1 wherein the device has a recess therein and the first plug means is solidly mounted in the recess.

3. The device according to claim 2 wherein the recess is accessible from the front of the device.

4. The device according to claim 1 wherein the first plug means is a multiprong connector, arranged and adapted for direct plug-in.

5. The device according to claim 1 comprising a plurality of first plug means and a plurality of switch means assigned to them and located above or below the plug means.

6. The device according to claim 4 wherein a plurality of multiprong connectors are located parallel to each other in a common recess and are located deep inside the device.

7. The device according to claim 4 wherein a plurality of multiprong connectors are double-pronged.

8. The device according to claim 2 wherein the recess contains a rectangular frame which has guide grooves for the second plug means in line with the plug-in plane of the first plug means.

9. The device according to claim 8 wherein the rectangular frame is a mass-produced item and has more guide grooves than there are first plug means and wherein a recess in line with these grooves is provided in the front of the device only in front of the grooves required for the plug means.

10. The device according to claim 8 wherein first plug means are mounted on the rectangular frame and the rectangular frame has a suitable cutout therefor.

11. The device according to claim 1 wherein the second plug means has a conductor plate which carries the circuit elements, a frame solidly connected to the conductor plate, one wall of which, when the second plug means is plugged in, closes the recess at least partially, a grip handle for withdrawing and plugging-in second plug means and an inscription field.

12. The device according to claim 11 wherein the frame has at least part of the conductor plate as bottom, wherein the upper edge of the frame is located at a higher level than the circuit elements and wherein the space between the frame is filled up to the frame's upper edge with a sealing compound.

13. The device according to claim 12 wherein the frame comprises two frame parts in whose center plane the conductor plate is located.

14. The device according to claim 1 wherein the device has guide grooves for the second plug means and the second plug means has two guide ribs which run parallel and apart from each other, with their distance corresponding to the clearance between the guide grooves and their thickness corresponding to the clearance width of the guide grooves.

15. The device according to claim 14 wherein the second plug means comprises a rectangular conductor plate within a frame, at least partially, and the guide ribs constitute first and second rim areas projecting beyond the frame of the rectangular conductor plate.

16. The device according to claim 1 wherein the second plug means comprises a conductor plate and the conductor plate has a rim area with which it can be plugged into the associated first plug means and has the contact means thereon.

17. The device according to claim 16 wherein the contact means are located in pairs on both sides of the conductor plate and are metallically connected to each other when plugged in.

18. The device according to claim 11 wherein the conductor plate has a rim area which has the contact means thereon and projects beyond the frame.

19. The device according to claim 11 wherein the inscription field is recessed and has a surface suitable for pasting on labels.

* * * * *